March 3, 1959
C. FARMER
2,876,449
METHOD OF WINDING ARMATURE CORES IN AN APPARATUS
Filed Sept. 21, 1956
4 Sheets-Sheet 1
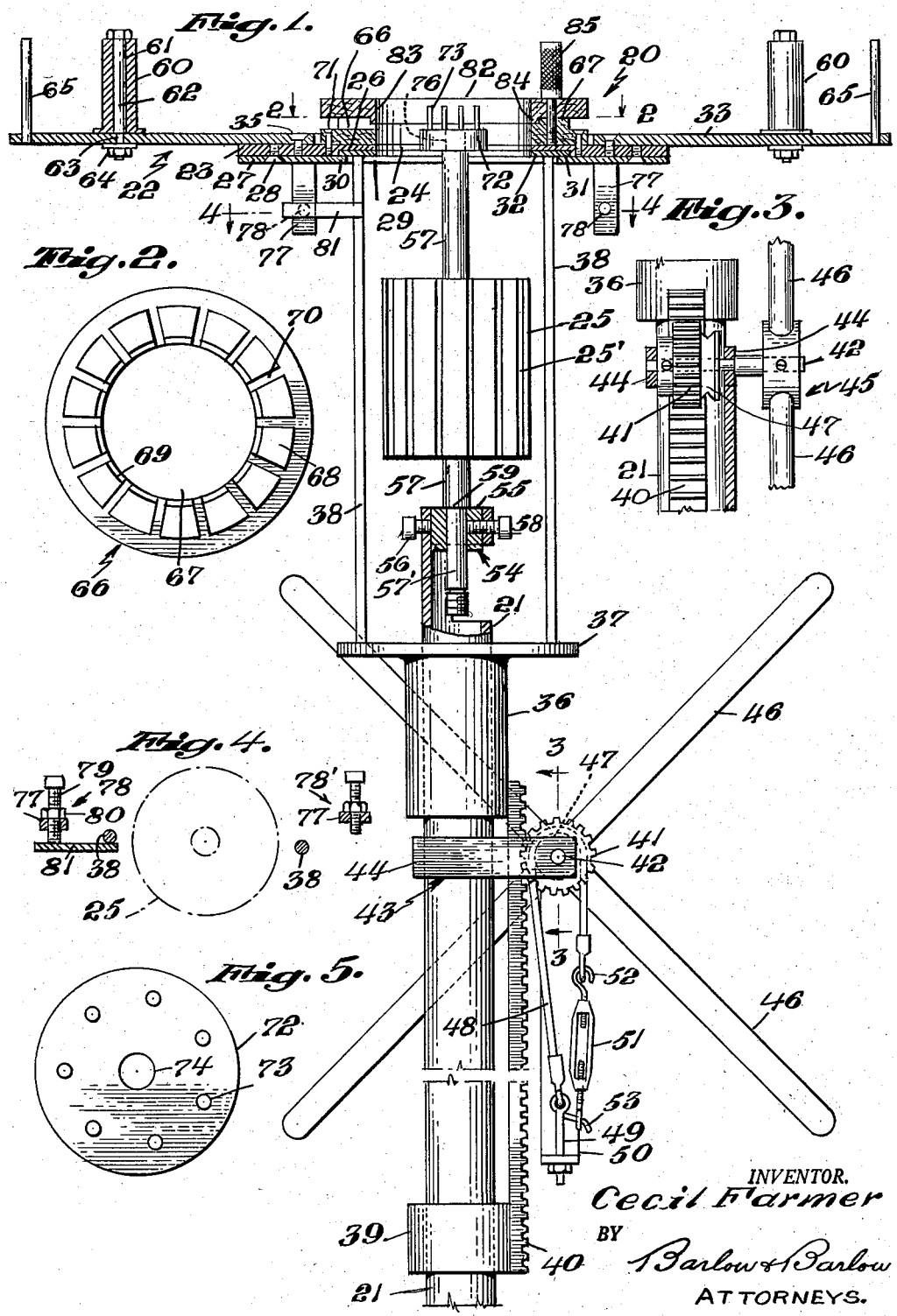
INVENTOR.
Cecil Farmer
BY
Barlow & Barlow
ATTORNEYS.

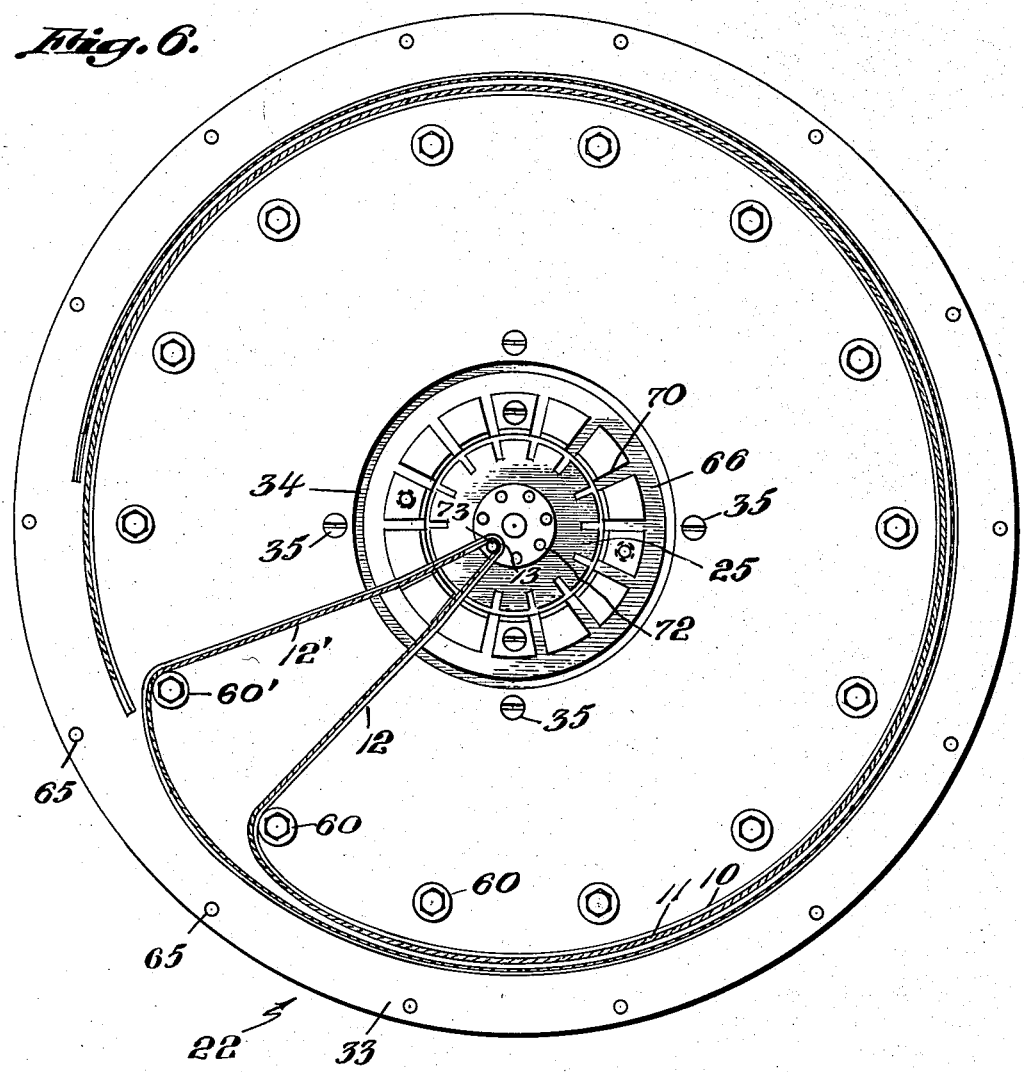

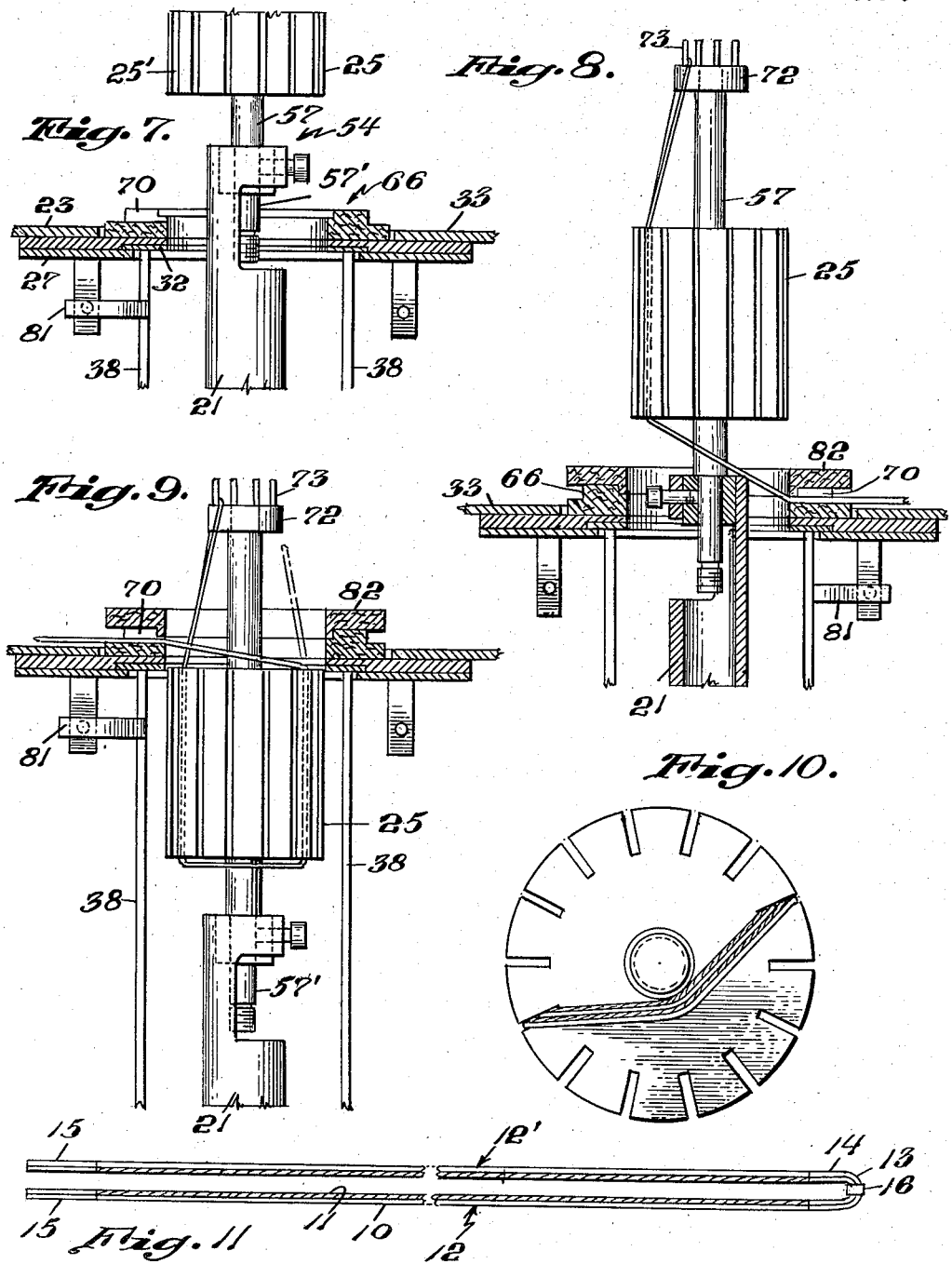

March 3, 1959 C. FARMER 2,876,449
METHOD OF WINDING ARMATURE CORES IN AN APPARATUS
Filed Sept. 21, 1956 4 Sheets-Sheet 4
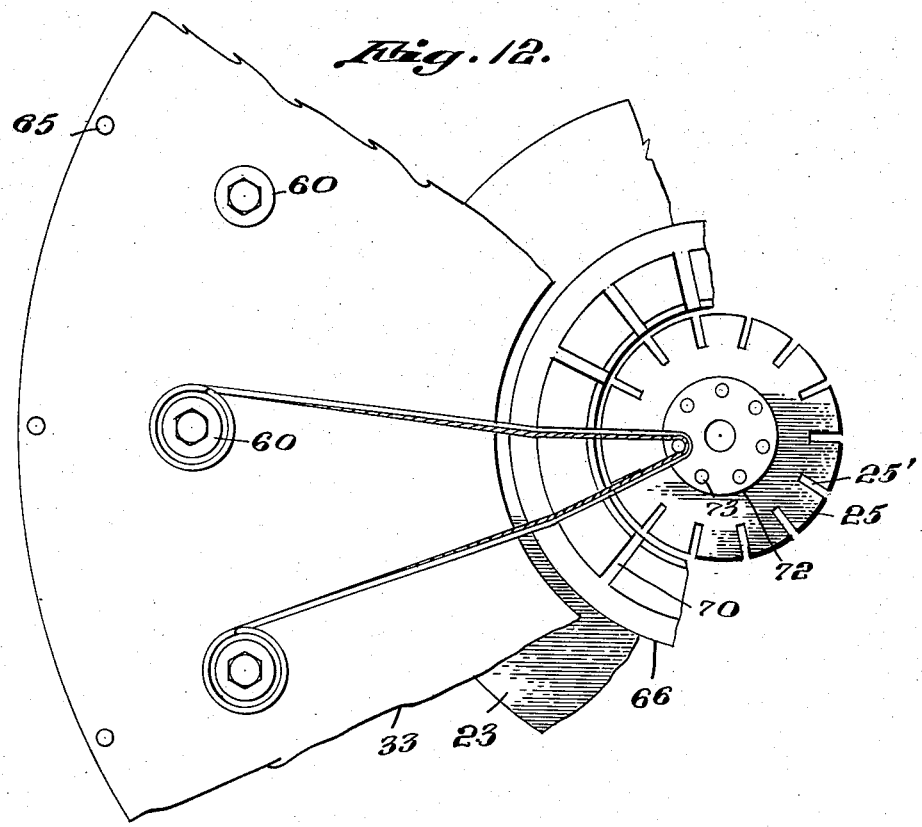
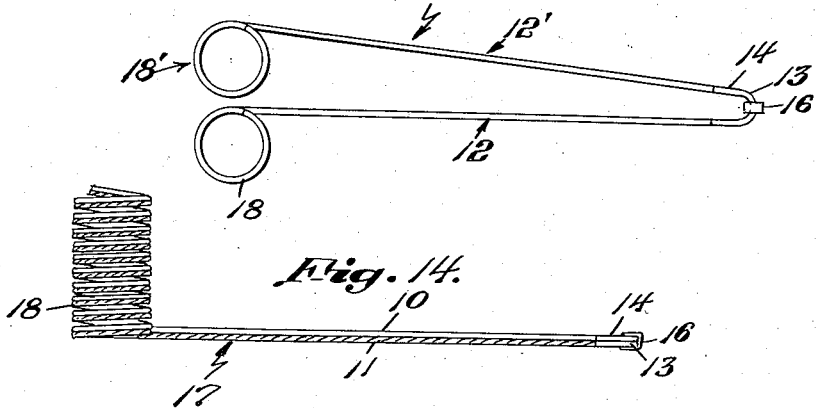
INVENTOR.
Cecil Farmer
BY
Barlow & Barlow
ATTORNEYS.

United States Patent Office 2,876,449
Patented Mar. 3, 1959

2,876,449

METHOD OF WINDING ARMATURE CORES IN AN APPARATUS

Cecil Farmer, Pawtucket, R. I.

Application September 21, 1956, Serial No. 611,189

6 Claims. (Cl. 29—155.58)

The invention relates to a method for winding coils in the grooves of the armature core element of an electric generator or motor and an apparatus particularly adapted for carrying out the method.

Heretofore in winding coils in the grooves of an armature core, the wire to be wound has been led from a supply source to be guided to the grooves of the core, or the coils have been preformed and thereafter inserted into said grooves.

An object of the invention is to provide a method for winding coils in the grooves of the armature core of an electric generator by the use of pre-arranged wire units.

Another object of the invention is to provide wire units to be used for winding coils in the grooves of the armature core of an electric generator.

Another object of the invention is to provide an apparatus of a simple construction which will be particularly adapted for use in winding pre-arranged wire units in the grooves of an armature core of an electric generator or motor.

A more specific object of the invention is to provide an apparatus for winding coils in the grooves of an armature core, wherein the apparatus will be relatively inexpensive and within the reach of workers in the repair branch of the industry.

With these and other objects in view, the invention consists of certain novel features of construction as will be more fully described and particularly pointed out in the appended claims.

In the accompanying drawings:

Figure 1 is an elevation of an apparatus for use in winding coils of an armature core of an electric generator embodying my invention;

Figure 2 is a top plan view of an element of the apparatus looking in the direction of the arrows on line 2—2 of Figure 1;

Figure 3 is a sectional view taken substantially along line 3—3 of Figure 1;

Figure 4 is a sectional view taken substantially along line 4—4 of Figure 1;

Figure 5 is a top plan view of a wire anchoring member forming part of the apparatus of Figure 1 and shown on an enlarged scale;

Figure 6 is a top plan view of the apparatus shown in Figure 1 with parts omitted for the sake of clearance;

Figures 7, 8 and 9 are similar elevational views illustrating different operations in the winding of coils into the grooves of an armature element;

Figure 10 is a bottom plan view of the armature element showing two coils wound in opposite grooves of the armature;

Figure 11 is a plan view of a wire unit forming part of the invention and for use in the apparatus of Figure 1;

Figure 12 is a top plan view of a fragmentary portion of the apparatus on an enlarged scale;

Figure 13 is a top plan view of modified wire unit; and

Figure 14 is a side elevation view thereof.

In accordance to the invention, I prepare a conducting wire of a sufficient length to form two coils for winding the armature core of an electric generator or motor which length I refer to as a unit. The present description will be concerned with winding the coils into the grooves of an armature core having fourteen grooves and in which the coils when finished will each consist of a separate wire. It will, of course, be understood that the invention is applicable for winding cores having a greater or lesser number of grooves and in which each coil may consist of two or more separate wires. According to the present example, each wire unit (see Figure 11) is made of two lengths of wire 10 and 11 which are electrically insulated and are each of a length to form two coils. One of said wires, as for example the wire 11, may have a usual cotton covering wound thereon. These two wires are bent at substantially the midpoint into a U-shape as shown, which provides a double length of wire 12 and 12' extending from the bight 13 of the U and each portion 12, 12' being sufficient to make one coil. The electrical insulation is removed at the bight portion as at 14 and may be also removed at the ends of the wires as at 15. The wires of each unit are held together such as by an adhesive tape 16 wound about the wires at the bight of the U. Thus the prepared wire units may be produced at a location removed from the location at which the cores are to be wound and kept intact until used.

In Figures 13 and 14 I have shown a wire unit 17 which is prepared as above described but with the portions 12 and 12' helically wound into tubular forms 18 and 18'. This form of unit has certain advantages as will hereinafter appear.

The manner of winding the above wire units into the grooves of the armature core will be described in connection with the description of an apparatus generally indicated 20 (Figure 1), which is particularly adapted for use in the practice of the invention. The apparatus 20 comprises an upright or cylindrical post 21 which may be conveniently made of a length of pipe of suitable material. The post is appropriately supported on a base (not shown) in a manner so as to provide a rigid support on which is attached the various other elements of the apparatus. A turntable 22 is arranged both for rotation about the post 21 and for sliding movement along the post. The turntable comprises a circular plate 23 which has a central opening 24 of a size slightly larger than the particular work to be operated upon such as the core 25 in the grooves 25' of which the above wire units are to be wound. The plate 23 is provided with an annular recess 26 which extends outwardly from the edge of said opening 24. A second circular plate 27 having a diameter substantially equal to the plate 23 is positioned on the plate 23 concentric therewith and is secured thereto as by means of screws 28. The plate 27 has a central opening 29 which is made of a diameter less than the diameter of the recess 26 and provides a marginal edge portion 30 which overlaps the recess 26 to form an annular groove or track 31 in which there is rotatably mounted a flat annulus 32, the bore of which is substantially equal to the diameter of opening 24. The table top 33, which may be of any appropriate shape, is shown as being circular (see Figure 6), and has a central opening 34 therethrough. The marginal edge portion about said opening overlays the plate 23 and is secured thereto as by means of clamp screws 35.

A sleeve 36 having a flange 37 is mounted on post 21 for sliding relation therewith and is coupled to the annulus 32 by means of rods 38 which are secured at their ends to said annulus 32 and to said flange 37, said rods being oppositely diametrically disposed on said annulus.

A second sleeve 39 is slidably mounted along post 21 at a location thereon beneath sleeve 36 and is connected thereto by a toothed rack 40 which is appropriately secured in position as by being welded to said sleeves. A pinion gear 41 extends into engagement with said rack and is secured to a shaft 42 for rotation therewith. The shaft is journalled in a bearing bracket 43 which is formed by two rectangular bars 44 secured to the post 21 at diametrically opposite sides thereof so as to project therefrom to straddle the rack. The shaft 42 is extended on one side of the bracket (see Figure 3) and has secured thereon a hand operated wheel 45 which has a plurality of spokes 46 providing handles for turning said wheel. It will be apparent the turning of wheel 45 will in turn rotate pinion 41 and through rack 40, sleeve 36, rods 38, move turntable 22 up or down post 21 depending upon the direction in which the wheel 45 is turned.

In order to prevent free downwardly sliding movement of turntable 22 and its support under action of gravity, a brake drum 47 (see Figures 1 and 3) is secured to the pinion 41 for rotation therewith. If desired, the drum 47 may be made integral with pinion 41. A brake band 48 (see Figure 1) extends about drum 47 and has one end anchored to an eye bolt 49 which is secured to a strap 50 which depends from the side of the bracket 43. The other end portion of the band is attached to a turn buckle 51 as at 52. A hook like element 53 projects from the eye bolt 49 and receives the other end of the turn buckle. Thus the brake band may be tensioned so as to oppose free sliding movement of table 22.

The upper end of post 21 is provided with a chuck 54 to receive and hold the core 25 in proper alignment to have the coils wound in the grooves 25' thereof. The chuck is illustrated in its simplest form comprising a bushing 55 which is inserted in the bore of post 21 and is detachably held in place by a set screw 56. The bore of bushing 55 is of a diameter to receive the reduced end 57' of the core shaft 57 and is held in place by a set screw 58. The reduced portion 57' of the shaft forms a shoulder 59 which engages against the bushing 55 and assures the proper positioning of the core 25 in place. It will be apparent that bushing 55 may be interchanged with a bushing having the proper size bore for the particular size shaft of the core to be wound. The distance of travel of the table 22 along the post 21 is such that the table may be lowered to beneath the chuck 54 when loading and unloading a core 25 (see Figure 7). It will be apparent since the table 22 is manually raised and lowered, it may be arrested at any position within the limits of travel in either direction.

The table is furnished with members which function as guides when the wire units of Figure 11 are used and as holders for use when the wire units are in the form disclosed in Figures 13 and 14. To this end there is provided a plurality of vertical disposed cylinders or spools 60 which are equal spaced angularly at the outer portion of the table top 33 (see Figure 6). The number of spools 60 is equal to the number of grooves 25' in the core 25. Each spool is similar and has a bore 61 (Fig. 1) in which is received a headed stud 62 having a threaded reduced shank 63 extending through the table top 33 and secured in position by a clamp nut 64. Thus each spool is rotatable mounted on stud 62 and preferably is made of a fiber material or the like so as to prevent chafing of the wires when moved thereabouts. The outer peripheral edge of the top 33 has a plurality of vertical extending pins 65 which are equally spaced angularly from each other and function as an upstanding rim at the peripheral edge of the table.

A guide 66 through which the wires pass to the core 25 is made of a fiber material and comprises a circular plate (see Figure 2) having a central opening 67 which is of a diameter substantially equal to the diameter of opening 24. The upper side of the guide 66 has a raised annular boss 68 provided with an inner disposed annular recess 69 and a plurality of wire receiving slots 70 which extend radially and are equally spaced from each other. The number of slots 70 is equal to the number of grooves in the core 25. The guide 66 is positioned in engagement with the plate 23 concentric therewith and is detachably secured thereto by screws 71.

A collarlike member 72, see Figures 1 and 5, has a plurality of pins 73 extending therefrom which are equally spaced angularly from each other and has an opening 74 (Fig. 5) therethrough for reception of the reduced end portion 76 of the other end of shaft 57. The number of pins 73 is equal to one half the number of slots in the guide 66.

The table 22 is arranged to be manually rotated 180° in either direction. To this end a pair of fingers 77 which are diametrical oppositely disposed are secured to the plate 30 to depend therefrom and are provided at their lower end portions with an adjustable stop 78 (see Figure 4). These are shown as comprising a thread bolt 79 which is adjustable secured in position by a lock nut 80. An arm 81 is fastened to one of the rods 38 in line to engage the stops 78. Thus referring to Figure 4, it will be seen that the arm may be turned in either direction 180°.

At the start of the wind, the table is lowered as shown in Figure 7 so as to position the chuck 54 above the level of the table top. The reduced end 57' of shaft 57 may now be inserted and secured in the chuck 54, and the grooves 25' are positioned in register with the slots 70 of guide 66. The member 72 may be positioned on the upper end of shaft 57, the member 72 being rotatable on shaft 57. The table may now be raised to the position shown in Figure 1 so as to position the pins 73 at the level of slots 70. The apparatus may now be loaded with the wire units.

Assuming the core element 25 to be wound with the wire units of Figure 11. Accordingly the bight 13 of such a unit is positioned about a pin 73 to be anchored thereon. The sides 12, 12' are inserted in adjacent slots 70 in guide member 66. The wire portion 12 is passed about a spool 60 and the wire portion 12' is passed about an adjacent spool 60' (see Figure 6). The trailing ends of the wire are now laid in the space between the spools 60 and pins 65. The next wire unit is likewise positioned on a pin 73 and threaded through a pair of adjacent slots 70, about spools 60 and the trailing ends of the wire positioned in the said space between spools 60 and pins 65. This is continued until the seven wire units have been inserted in proper position on the turntable and anchored on pins 73. For the sake of clearance, only one wire unit has been shown in position in Figure 6. It will be apparent that upon the complete loading of the machine, wire units will extend from the seven pins 73 and the portions 12, 12' will extend about each spool 60 with the trailing ends of this wire laid one upon the other in the space between pins 65 and spools 60. A closure or retaining member 82 is next positioned in engagement with the guide 66 to overlay the slots 70 and retain the wires within the slots. This member is a circular plate having a diameter equal to the diameter of guide 66 and a central opening likewise having a diameter equal to the diameter of opening of guide 66. The member is made of a fiber material and has an annular lip 84 (see Figure 1) which is adapted to rest within the recess 69 of guide 66. A screw threaded member 85 detachably holds member 82 in position. The turntable 22 may now be lowered which will cause the wires to be lodged in the grooves 25' which as previously stated are in registry with the slots 70 (Figure 8). The pull of the wires on collar member 72 will hold the same against movement relative to shaft 57. The table 22 is lowered to a position about one inch or so below the lower end of the core 25. The opposite sides or portions 12, 12' will have been inserted into the grooves the full length of the core. The table may now be turned or indexed 180° by manually turning the same to cause arm 81 to engage the opposite stop 78. This will cross the wires over in registry with the opposite grooves in which the wires are to be lodged. The table is now raised to cause the wires to be inserted into said opposite grooves in core 25 (Figure 9). The table is raised to a height to position the upper side thereof about one inch or so above the upper end of the core 25. The table is next indexed to its original position so as to cross the wires over into registry with the initial slots entered. It will be seen in this Figure 9 that the wires extend from the pin 73 through one side of the core, thence across the lower end thereof, up the side and in registry with the initial slots. This completes the wind of one coil. The table is again lowered, indexed and raised in a like manner to wind the second coil on top of the previously wound coil, thus completing the wind with the free end portions of the wire unit extending in the broken line position of Figure 9. The wound core may now be removed from the apparatus and the loops servered.

It will be apparent from the foregoing, the wire units are each of equal lengths and consequently mechanically balanced. It will also be apparent that the wind is such as to be electrically in balance.

Referring to Figure 12, there is shown the apparatus as used for the form of wire unit shown in Figures 13 and 14. The same procedure as above described is followed with the exception that the tubular portions 18, 18' are positioned on the spools, the wires unwinding from the portions 18, 18' as being wound in the grooves of the core 25. It will be apparent wire wound in coil formation will offer some resistance to the wire being straightened. The smaller the diameter of the coil, the greater the resistance to the wire being straightened. Thus, there will be a resistance in the wire against its being unwound and straightened against the pull thereon during the winding thereof about the armature core, and this resistance will provide a tension on the wire during the said winding of the armature core. In arranging the units in the coil form, much time is saved in loading the apparatus with the wire units.

The invention has been described in connection with an armature core element having a particular number of grooves. The apparatus is, however, adapted for use for winding core elements having a greater or less number of grooves by interchanging the present guide 66 disclosed for one having the required number of guide slots 70 therein.

I claim:

1. The method of winding coils in the grooves of an armature core of an electric generator and the like, comprising the steps of pre-cutting wire into a unit length sufficiently long to wind two separate coils about said core, detachably securing said unit length of wire at the middle thereof to one end of the shaft of said core with two parts of a length extending therefrom, thence extending each of said parts radially from said core to align one part with one groove of the core and the other part with a separate groove of said core, thence simultaneously inserting both of said parts in the grooves with which they are aligned, thence passing said wire parts across the other end of the core to position each wire part in line with a groove generally diametrically opposite each groove in which the part was first inserted, thence inserting said parts into said opposite grooves, thence passing the wire parts to position the same in line with the grooves in which they were first inserted, thence similarly continuing the winding of the wire parts into their respective grooves so as to simultaneously complete the winding of two coils on the core.

2. The method of claim 1 and thereafter severing the wires at the said middle thereof.

3. The method of winding coils in the grooves of an armature core of an electric generator and the like, comprising the steps of cutting wire into a unit length sufficiently long to wind two separate coils about said core, folding said unit length at the middle back upon itself into U-form with the two parts extending from the bight and coiling the two parts into helical coils, detachably securing said unit at the bight thereof to one end of the shaft of said core with the two coils mounted on an axis adjacent thereto, thence while drawing the wire from said coils extending each of said parts radially from said core to align one part with one groove of the core and the other part with a separate groove of said core, thence simultaneously inserting both of said parts in the grooves with which they are aligned, thence passing said wire parts across the other end of the core to position each wire part in line with a groove generally diametrically opposite each groove in which the part was first inserted, thence inserting said parts into said opposite grooves, thence passing the wire parts to position the same in line with the grooves in which they were first inserted, thence similarly continuing the winding of the wire parts into their respective grooves so as to simultaneously complete the winding of two coils on the core.

4. The method of claim 3 and thereafter severing the wires adjacent the bight thereof.

5. The method of winding coils in the grooves of an armature core of an electrical generator and the like, comprising the steps of cutting wire in a plurality of unit lengths each sufficiently long to wind two separate coils about said core, folding each of said units at the middle thereof into a U-form, detachably securing each of said units at the bight thereof to one end portion of the shaft of said core with two parts of the length extending therefrom, thence extending each of said parts of each unit wire radially from said core to align one part with one groove of the core and the other part with a separate groove of said core, thence simultaneously inserting all of said parts in the grooves aligned therewith, thence passing said wire parts across the core to position each wire part in line with a groove generally diametrically opposite each groove in which the part was first inserted, thence inserting said parts into said opposite grooves, thence passing the wire parts to position the same in line with the grooves in which they were first inserted, thence continuing the winding of the wire parts into their respective grooves so as to simultaneously complete the winding of all of the coils on the core.

6. The method of claim 5 and thereafter severing the wires at the bight portions thereof.

References Cited in the file of this patent

UNITED STATES PATENTS

| | | |
|---|---|---|
| 494,042 | Thomas | Mar. 21, 1893 |
| 504,390 | Konz | Sept. 5, 1893 |
| 1,304,780 | Kepler | May 27, 1919 |
| 1,622,185 | Dewey | Mar. 22, 1927 |
| 2,026,365 | Slabey | Dec. 31, 1935 |
| 2,173,091 | Armstrong | Sept. 19, 1939 |
| 2,306,855 | Allen | Dec. 29, 1942 |
| 2,455,355 | Combs | Dec. 7, 1948 |
| 2,503,752 | Malchus | Apr. 11, 1950 |
| 2,589,521 | Wheeler et al. | Mar. 18, 1952 |
| 2,633,552 | Rainone | Mar. 31, 1953 |
| 2,684,428 | Bixler | July 20, 1954 |
| 2,743,508 | Isaacson | May 1, 1956 |